United States Patent [19]
Chung

[11] Patent Number: 5,388,921
[45] Date of Patent: Feb. 14, 1995

[54] STRUCTURE OF COMPUTER KEYBOARD (I)

[75] Inventor: Stephen Chung, Taipei Hsien, Taiwan, Prov. of China

[73] Assignee: Silitek Corporation, Taipei, Taiwan, Prov. of China

[21] Appl. No.: 185,148

[22] Filed: Jan. 24, 1994

[51] Int. Cl.⁶ .............................................. B41J 5/10
[52] U.S. Cl. .................................... 400/472; 400/82; 400/489
[58] Field of Search ................. 400/472, 482–486, 400/488, 489, 82

[56] References Cited

U.S. PATENT DOCUMENTS

| | | | |
|---|---|---|---|
| 4,735,520 | 4/1988 | Suzuki et al. | 400/488 |
| 5,067,834 | 11/1991 | Szmanda et al. | 400/82 |
| 5,073,050 | 12/1991 | Andrews | 400/82 |
| 5,141,343 | 8/1992 | Roylance et al. | 400/472 |
| 5,318,367 | 6/1994 | Braun et al. | 400/488 |

Primary Examiner—Edgar S. Burr
Assistant Examiner—Lynn D. Hendrickson
Attorney, Agent, or Firm—Browdy and Neimark

[57] ABSTRACT

A computer keyboard includes two symmetrical parts, each consisted of a bottom shell supported on a common base plate above a common bottom plate, and a top shell supported on the respective bottom shell, wherein the bottom shell has inverted T-rods made to slide in respective arched slots on the base plate, a locating block made to slide in a guide groove on the base plate; the base plate has a spring stop strip terminated to a projecting potion engaged into a serrated side wall of the locating block of the bottom shell; a lifting mechanism is connected between the top and bottom shells and controlled to turn the top shell on mounting lugs on the bottom shell permitting the top shell to be moved from a horizontal position to a sloping position or from the sloping position to the horizontal position.

1 Claim, 5 Drawing Sheets

5,388,921

STRUCTURE OF COMPUTER KEYBOARD (I)

BACKGROUND OF THE INVENTION

The present invention relates to computer keyboards, and relates more particularly to such a computer keyboard which is consisted of two parts, each part being adjustable horizontally as well as vertically.

A variety of computers are known and widely used in different fields. As the keyboard of a normal computer system is made in a rectangular shell which does not fit the hands ergonomically, the muscles and nerves of the hands may be hurt easily after a long period of time in operation.

SUMMARY OF THE INVENTION

The present invention has been accomplished to provide a computer keyboard which eliminates the aforesaid problem. It is therefore an object of the present invention to provide a computer keyboard which is comprised of two symmetrical parts that can be respectively adjusted horizontally to fit over the hands ergonomically for a comfortable operation. It is another object of the present invention to provide a computer keyboard which is comprised of two symmetrical parts that can be be respectively tilted in reversed directions to fit over the hands for a comfortable operation.

According to the preferred embodiment of the present invention, the computer keyboard comprises two symmetrical parts, each consisted of a bottom shell supported on a common base plate above a common bottom plate, and a top shell supported on the respective bottom shell, wherein the bottom shell has inverted T-rods made to slide in respective arched slots on the base plate, a locating block made to slide in a guide groove on the base plate; the base plate has a spring stop strip terminated to a projecting potion engaged into a serrated side wall of the locating block of the bottom shell; a lifting mechanism is connected between the top and bottom shells and controlled to turn the top shell on mounting lugs on the bottom shell permitting the top shell to be moved from a horizontal position to a sloping position or from the sloping position to the horizontal position.

DETAILED DESCRIPTION OF THE PREFERRED EMBODIMENT

Figure 2:
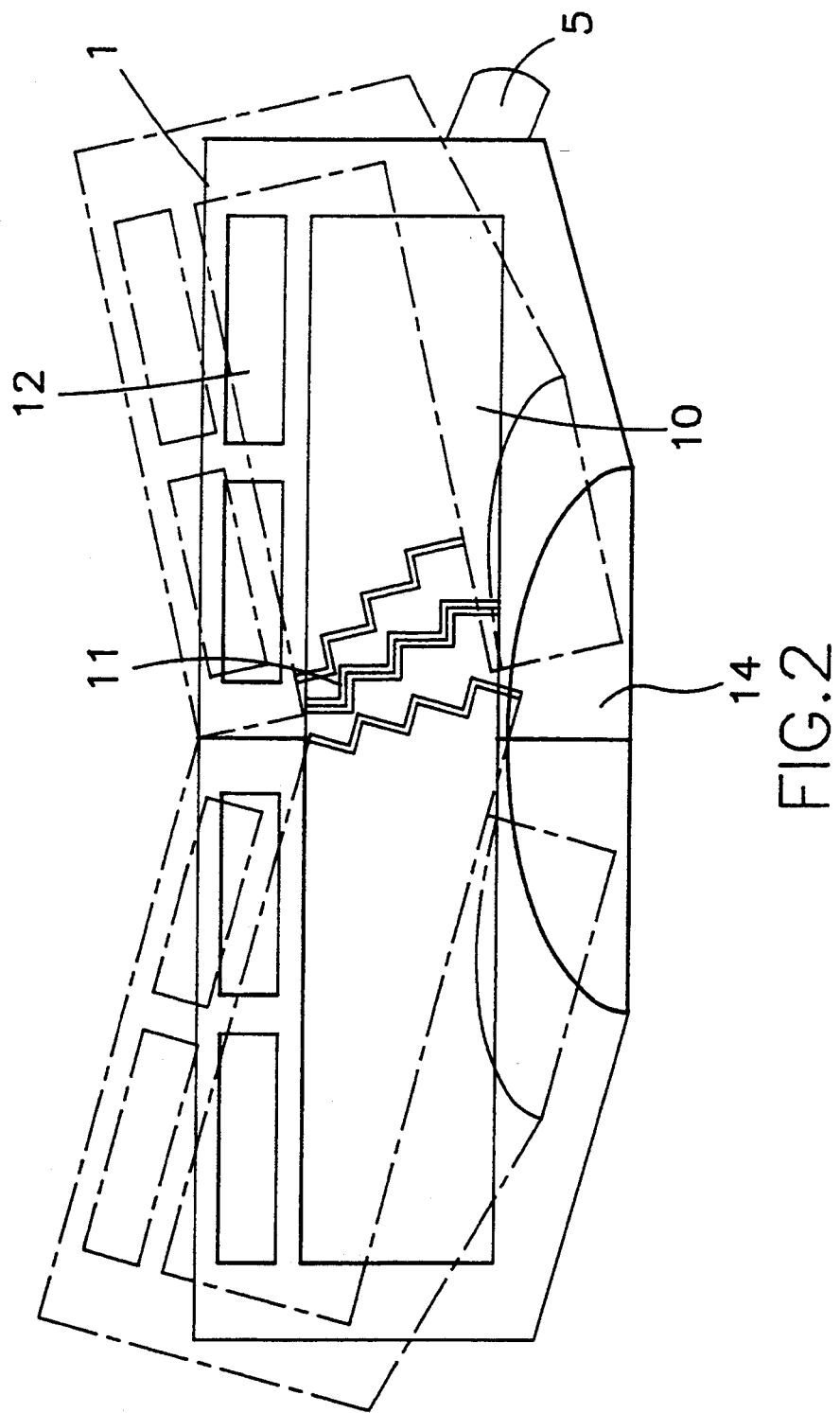
FIG. 2 shows the keyboard of FIG. 1 adjusted horizontally.
Figure 3:
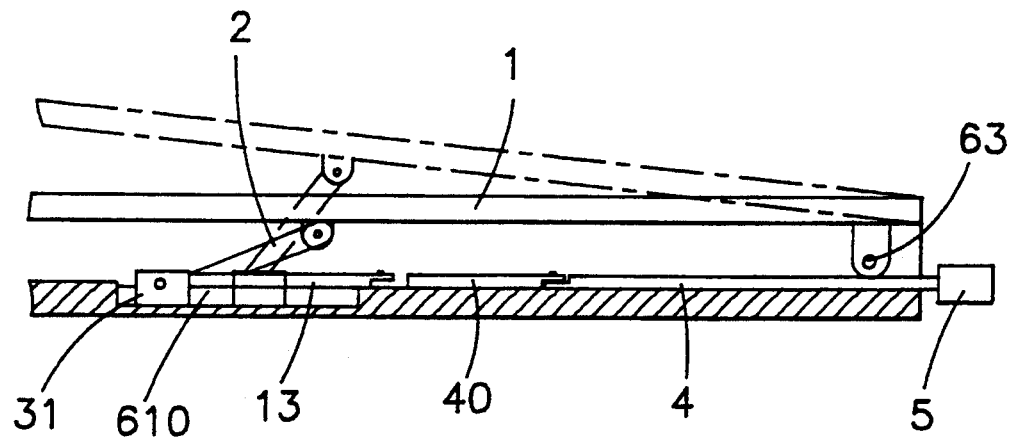
FIG. 3 a side plain view of the computer keyboard of FIG. 1 showing the top shell lifted from the bottom shell.

A computer keyboard in accordance with the present invention comprises two symmetrical parts (See FIG. 2). As the two symmetrical parts are similar, only one part of the computer keyboard is described in detail.

Figure 1:
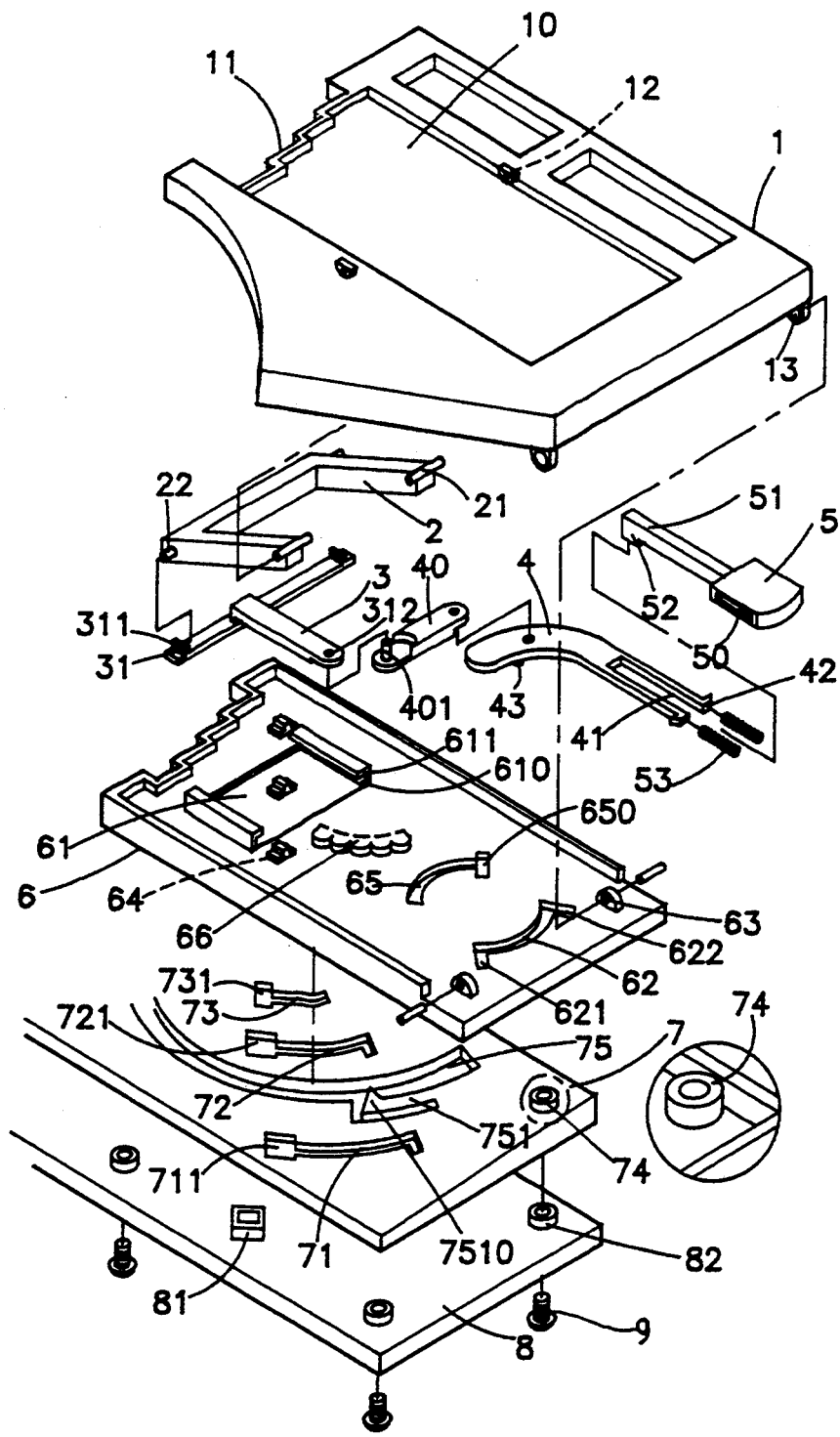
FIG. 1 is an exploded view of a computer keyboard according to the preferred embodiment of the present invention.
Figure 4:
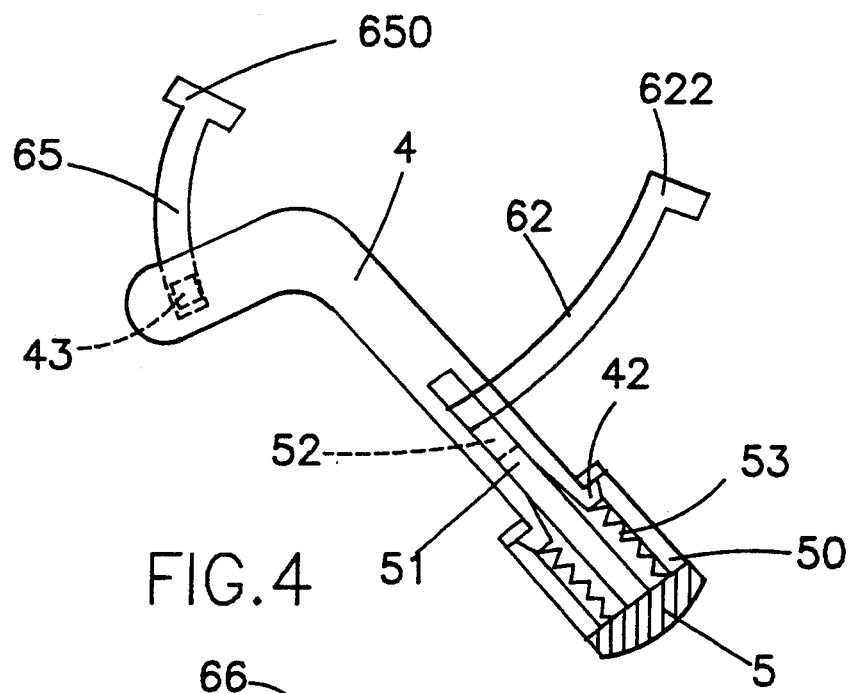
FIG. 4 shows the connection between the lever and the push knob.
Figure 5:
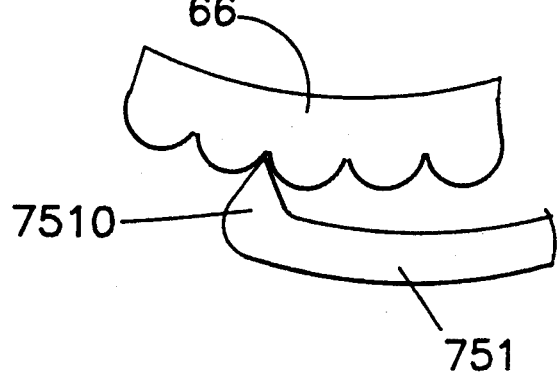
FIG. 5 shows the projecting portion of the spring stop strip engages into the serrated side wall of the arched locating block of the bottom shell.
Figure 6:
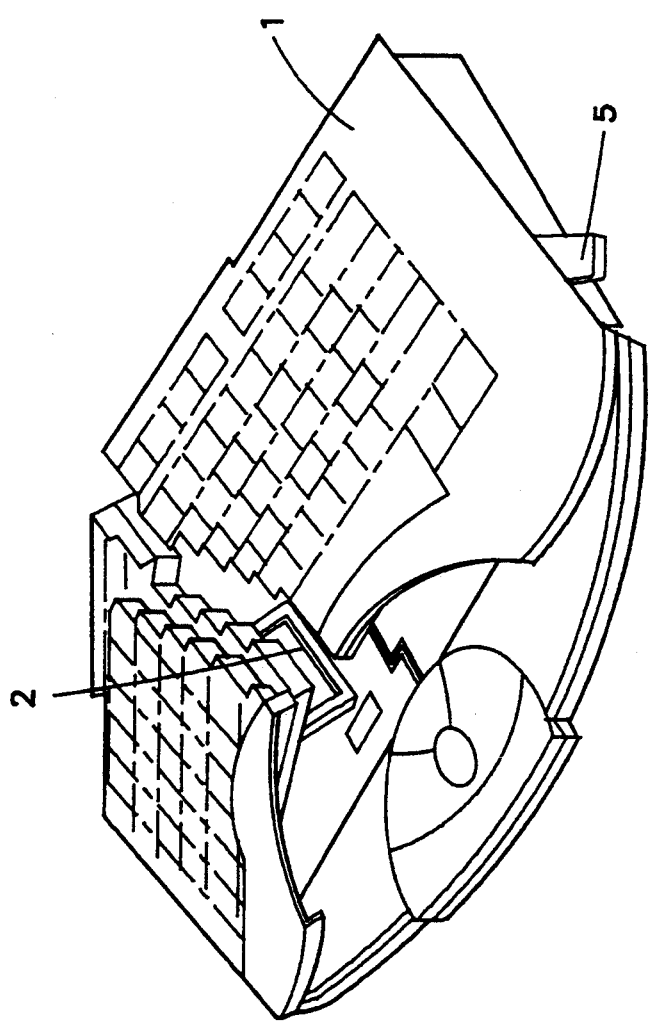
FIG. 6 is an elevational view of the computer keyboard of the present invention showing the upper shell turned to a sloping position on the bottom shell.

Referring to FIG. 1, the present invention comprises a bottom plate 8, a base plate 7 fastened to the bottom plate 8 at the top, a bottom shell 6 made to slide on the base plate 7 horizontally, and a top shell 1 supported on the bottom shell 6. The base plate comprises a plurality of arched slots 71;72;73 of different curvature, of which each having one end terminated to an expanded hole 711;721;731, an arched guide groove 75 spaced between two arched slots 71;72, a spring stop strip 751 disposed along one side of the guide groove 75 and having a projecting portion 751 at one end, and a plurality of internally threaded bottom stub rods 74 spaced around the border of the bottom wall thereof. The bottom plate 8 comprises a plurality of hollow stub rods 82 respectively connected to the internally threaded bottom stub rods 74 of the base plate 7 by screws 9, and a plurality of locating blocks 81 raised from the top surface thereof and respectively fitted into the expanded holes 711;721;731 of the arched slots 71;72;73. The bottom shell 6 comprises a plurality of inverted T-rods 64 respectively inserted into the expanded holes 711;721;731 of the arched slots 71;72;73 (before the installation of the locating blocks 81 of the bottom plate 8) and then moved sideways to slide in the arched slots 71;72;73, an arched locating block 66 corresponding to the arched guide groove 75, which has a serrated side wall into which the projecting portion 7510 of the spring stop strip 751 engages (see FIG. 5), a recessed portion 61, which comprises two parallel slide grooves 611 at two opposite sides, a first arched slot 62, which comprises a front end hole 621 and a rear end hole 622 respectively turned sideways from two opposite ends thereof, two opposite mounting lugs 63 raised from the top surface thereof and spaced at one side, a second arched slot 65 spaced between the first arched slot 62 and the recessed portion 61 and having one end terminated to an expanded hole 650. There is provided a T-bar 3 comprising a transverse section 31 made to slide between the slide grooves 610 on the recessed portion 61 of the bottom shell 6, and a longitudinal section having a pin hole 312 connected to a link 40. The transverse section 31 has pivot holes 311 raised from two opposite ends thereof to which a substantially U-shaped lifting rod 2 is pivoted. The U-shaped lifting rod 2 comprises two first pivots 22 longitudinally aligned in the middle at two opposite sides and respectively inserted into the pivot holes 311 on the transverse section 31 of the T-bar 3, and two second pivots 21 at two opposite ends thereof respectively inserted into respective pivot holes 12 on the top shell 1. The link 40 comprises a pin 401 at one end inserted into the pin hole 312 on the longitudinal section of the T-bar 3. The opposite end of the link 40 is coupled to a lever 4. The lever 4 has a front end pivoted to the link 40 and a rear end terminated to two opposite hooks 42 spaced by a longitudinal opening 41. The lever 4 further comprises a bottom rod 43 inserted through the expanded hole 650 and then moved into the second arched slot 65 on the bottom shell 6, and therefore the rear end of the lever 4 can be alternatively moved back and forth along the second arched slot 65 (see FIG. 4). There is provided a push knob 5 having a hollow head 50 connected to the hooks 42 of the lever 4, and a unitary push rod 51 perpendicularly extended from the hollow head 50 and inserted into the longitudinal opening 41 on the lever 4. The push rod 51 of the push knob 5 terminates to a bottom rod 52 at right angles made to slide in the first arched slot 61 on the bottom shell 6 (See FIG. 4). The hooks 42 of the lever 4 are respectively inserted into a hole (not shown) on the hollow head 50 of the push knob 5 and retained connected to the hollow head 50 of the push knob 5 by spring elements 53 (see FIG. 4). The top shell 1 comprises two opposite mounting lugs 13 spaced on the bottom wall thereof at one side and respectively pivoted to the mounting lugs 63 of the bottom shell 6, and pivot holes 12 spaced on the bottom wall, which receive the second pivots 21 of the U-shaped lifting rod 2 respectively, a key switch mounting area 10, which receives a key switch assembly, and a zig-zag side matching portion 11 fitting over the corresponding zig-zag side matching portion on the opposite part of the computer keyboard (see FIG. 2).

Figure 7:
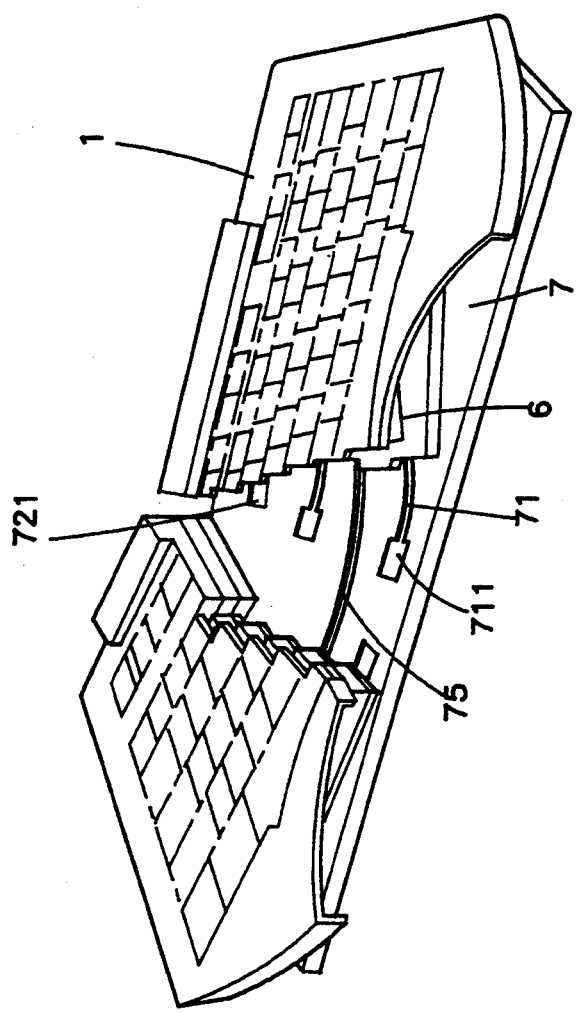
FIG. 7 is another elevational view of the computer keyboard of the present invention showing the top and bottom shells adjusted horizontally.

Referring to FIGS. 2, 3, 4, 5, and 6, by means of sliding the inverted T-rods 64 in the arched slots 71;72;73, the top and bottom shells 1;6 can be moved on the base plate 7 horizontally (see FIGS. 2 and 7). As the bottom shell 6 is moved horizontally on the base plate 7, the projecting portion 7510 of the spring stop plate 751 passes over the serrated side wall of the arched locating block 66 of the bottom shell 6. Each time the projecting portion 7510 of the spring stop plate 751 is moved from one pitch between either two teeth of the serrated side wall of the arched locating block 66 to another, a click sound is produced. Further, the spring elements 53 give an outward pressure to the hollow head 50 of the push knob, causing the bottom rod 52 of the push rod 51 of the push knob 5 constantly retained in the rear end hole 622 of the first arched slot 62. When the hollow head 50 of the push knob 5 is pushed inwards to release the bottom rod 52 of the push rod 51 from the rear end hole 622, the lever 4 can then by moved by the push knob 5. As the bottom rod 52 of the push rod 51 of the push knob 5 is moved from the rear end hole 622 to the front end hole 621 (see FIGS. 3 and 4), the link 40 is simultaneously driven by the lever 4 to pull the T-bar 3 outwards, causing the U-shaped lifting rod 2 turned on the transverse section 31 of the T-bar 3, and therefore the top shell 1 is lifted from the bottom shell 6 and turned about the mounting lugs 63 on the bottom shell 6 (see FIG. 3 and 6). Therefore, the top shell 1 can be tilted on the bottom shell 6.

As indicated, by means of sliding the T-rods 64 in the arched slots 71;72;73, the top and bottom shells 1;6 can be adjusted horizontally on the base plate 7; by means of the engagement between the projecting portion 7510 of the spring strop strip 751 and the serrated side wall of the locating block 66, the top and bottom shell 1;6 can be retained in position on the base plate 7 horizontally; by means of the control of the push knob 5, the top shell 1 can be adjusted to a desired sloping position above the bottom shell 6.

What is claimed is:

1. A computer keyboard including two movable symmetrical parts comprising a bottom plate, a base plate affixed to said bottom plate at the top, a bottom shell having mounting lugs, a recessed portion, an inner arched slot and an outer arched slot, said bottom shell supported on said base plate, and a top shell supported on said bottom shell to hold a set of key switches;

a lifting mechanism connected between said top and bottom shells and controlled to turn said top shell on the mounting lugs of said bottom shell in moving said top shell from a horizontal position to a sloping position or from a sloping position to a horizontal position;

wherein said lifting mechanism comprises two parallel sliding grooves and a T-bar having a transverse section made to slide between said two parallel sliding grooves to said recessed portion on said bottom shell and said T-bar further having a longitudinal section perpendicularly extended from said transverse section;

said lifting mechanism further comprising a substantially U-shaped lifting rod having a straight middle rod section pivoted to the transverse section of said T-bar and said U-shaped lifting rod further having two end rod sections perpendicularly extended from two opposite ends of said straight middle rod section and respectively pivoted to the underside of said top shell, said lifting mechanism having a lever, a link connected between said lever and said T-bar, and push knob connected to said lever;

said lever comprising a rear end connected to one end of said link, a bottom rod near the rear end thereof made to slide in said inner arched slot on said bottom shell, and a forked front end, said forked front end of said lever comprising two opposite hooks spaced by a longitudinal opening thereof, said two opposite hooks being respectively inserted into a hole on said push knob and retained in place by spring elements;

said push knob comprising a push rod disposed in the longitudinal opening on said forked front end of said lever, the push rod of said push knob comprising a bottom rod made to slide in said outer arched slot on said bottom shell.

* * * * *